(12) United States Patent
Lee

(10) Patent No.: US 7,687,959 B1
(45) Date of Patent: Mar. 30, 2010

(54) BRUSHLESS A-C MOTOR

(76) Inventor: S. Peter Lee, 17900 Ridgeway Rd., Granada Hills, CA (US) 91344

( * ) Notice: Subject to any disclaimer, the term of this patent is extended or adjusted under 35 U.S.C. 154(b) by 218 days.

(21) Appl. No.: 12/002,260

(22) Filed: Dec. 17, 2007

(51) Int. Cl.
*H02K 1/00* (2006.01)

(52) U.S. Cl. .......................... 310/166; 310/43; 310/71; 310/75 R; 310/254.1

(58) Field of Classification Search .................. 310/43, 310/71, 75 R, 156.08, 166, 254.1
See application file for complete search history.

(56) References Cited

U.S. PATENT DOCUMENTS

| | | | | |
|---|---|---|---|---|
| 4,097,754 | A | * | 6/1978 | Farr .......................... 310/67 R |
| 4,393,320 | A | | 7/1983 | Anderson |
| 5,767,601 | A | * | 6/1998 | Uchiyama ................... 310/190 |
| 5,894,183 | A | | 4/1999 | Borchert |
| 6,093,984 | A | * | 7/2000 | Shiga et al. .................... 310/26 |
| 6,396,177 | B1 | * | 5/2002 | Shin et al. ..................... 310/63 |
| 6,429,566 | B1 | * | 8/2002 | Kuwahara .............. 310/156.56 |
| 6,727,632 | B2 | * | 4/2004 | Kusase ........................ 310/266 |
| 6,759,779 | B2 | * | 7/2004 | Neet .......................... 310/180 |
| 6,984,908 | B2 | | 1/2006 | Rinholm et al. |
| 7,183,684 | B2 | | 2/2007 | Miyashita |
| 7,183,686 | B2 | | 2/2007 | Sasaki et al. |
| 7,233,092 | B2 | | 6/2007 | Murakami et al. |
| 7,262,526 | B2 | | 8/2007 | Shiga et al. |

* cited by examiner

*Primary Examiner*—Tran N Nguyen
(74) *Attorney, Agent, or Firm*—Albert O. Cota

(57) ABSTRACT

A brushless a-c motor (BACM) (10) consisting of a non-conductive stator (12) and a rotor (44). The rotor (44) has an outer surface (50), a right surface (34) and a left intermediate surface (16) from where extends a protrusion (20) having a cavity (26) into which is inserted a motor support rod (38). The stator (12) includes a multiplicity of longitudinally extending wiring notches (36) and on the left intermediate surface (16) and the right surface (34) are wire attachment structures (18). Around and between the structures (18) and the notches (36) is wound a multiplicity of insulated wires (32) that terminate at an a-c power source (180). The rotor (44) has an inner surface (48) that has longitudinally attached a multiplicity of magnets (56) and is attached to a bearing (80) that is attached to the central protrusion (20). To operate the BACM (10), one end of a circular belt (98) is placed around the rotor (44) and the opposite end is inserted over a work piece.

18 Claims, 4 Drawing Sheets

BRUSHLESS A-C MOTOR

TECHNICAL FIELD

The invention generally pertains to electrical motors and more particularly to a brushless a-c motor that utilizes a non-conductive stator having wire windings that are wound parallel to the longitudinal axis of the stator.

BACKGROUND ART

Electrical motors are generally classified as alternating-current (a-c) motors or direct-current (d-c) motors. In either classification the motors are designed to receive electrical energy and convert that energy into mechanical energy, also referred to as "torque". A-c motors are used more often than d-c motors because of the availability of a-c power over d-c power. All motors however, sustain energy losses in converting the electrical energy to the mechanical energy. This loss is due to bearing friction, cogging, the resistance loss that occurs by current flowing through the conductors of the motor armature, the electrical field and core losses that are due to hysteresis and eddy currents. These losses can contribute to a non-smooth rotation, the production of heat and lower efficiency.

Prior art motors utilize laminated metal stators that have wire windings which are wound perpendicular to the longitudinal axis of the rotor. The windings produce the magnetic force that pushes or pulls against a set of magnets which are located around the rotor of the motor. In contrast, the inventive brushless a-c motor utilizes a stator that is made of a non-conductive material such as plastic and a metal rotor that rotates around the stator to produce a rotational force. The non-conductive stator has wire windings that are wound parallel to the longitudinal axis of the stator. The rotational force is produced when current flows through the wires. The combination of the non-conductive stator, the permanent magnets in the rotor and the novel wire winding eliminates or at least minimizes the problems listed above for the prior art motors. Additionally, the inventive design provides a high efficiency electrical energy converter.

A search of the prior art did not disclose any literature or patents that read directly on the claims of the instant invention. However, the following U.S. patents are considered related:

| PATENT NO. | INVENTOR | ISSUED |
| --- | --- | --- |
| 7,183,686 | Sasaki et al | 27 Feb. 2007 |
| 7,183,684 | Miyashita | 27 Feb. 2007 |
| 5,894,183 | Borchert | 13 Apr. 1998 |
| 4,393,320 | Anderson | 12 Jul. 1983 |

The U.S. Pat. No. 7,183,686 discloses a synchronous motor that includes a stator, a rotor and permanent magnets. The rotor includes a rotor iron core that rotates relative to the stator, and a plurality of conductor bars accommodated within corresponding slots in the rotor iron core. The conductor bars have opposite ends that are short circuited by respective short circuit rings to form a starter cage conductor. The rotor also has a plurality of magnet retaining slots located on an inner side of the conductor bars, in which permanent magnets are embedded.

The U.S. Pat. No. 7,183,684 discloses a permanent magnet rotary motor that can maintain a higher torque density and reduce cogging torque when compared to a conventional permanent magnet rotary motor. A pair of end surfaces from each permanent magnet is used for a rotor that is placed substantially parallel to a virtual plane. The virtual plane extends in the radial direction of a rotor core while passing through the centers of a stator core.

The U.S. Pat. No. 5,894,183 discloses a permanent magnet rotor for an electric generator or motor having a core lamination hub formed from a stack of round plates. The plates have peripheral slots for holding the first end of a rectangular magnet. Each magnet has an outer end which is held by a slotted pole piece formed from laminated plates. A first and a second side plate overlie each side of the lamination hub, the magnets and the pole pieces. Fasteners are passed through holes in the side plates, hub plates and pole pieces to form a rigid rotor.

The U.S. Pat. No. 4,393,320 discloses a permanent magnet rotor comprising a housing defining a central rotor axis and an inner ring secured within the housing. Annularly extending around the rotor axis is a plurality of permanent magnets that are annularly spaced around the inner ring. An outer ring is secured within the housing and annularly extending around the permanent magnets are a plurality of outer ring segments. The rotor has a filler material that fills the spaces between adjacent permanent magnets and adjacent the outer ring segments.

For background purposes and as indicative of the art to which the invention is related, reference may be made to the following remaining patents located in the search:

| PATENT NO. | INVENTOR | ISSUED |
| --- | --- | --- |
| 7,262,526 | Shiga, et al | 28 Aug. 2007 |
| 7,233,092 | Murakami, et al | 19 Jun. 2007 |
| 6,984,908 | Rinholm, et al | 10 Jan. 2006 |

SUMMARY OF THE INVENTION

The brushless a-c motor (BACM) disclosed herein is designed to provide a high performance motor that features a stator which is made of a non-conductive material and has windings that are wound parallel to the longitudinal axis of the stator.

In its basic design, the BACM is comprised of four major elements: a circular stator, a circular rotor, a bearing and a circular belt.

The circular stator is made of plastic and includes an outer surface, a left intermediate surface and a right surface. The outer surface has a multiplicity of longitudinally extending wire notches. Extending from the left intermediate surface is a first set of wire attachment structures and an integral central protrusion.

From the right surface of the stator extends a second set of wire attachment structures. Around and between the two sets of attachment structures and inserted into the longitudinal wiring notches is a multiplicity of insulated wires that are wound parallel to the longitudinal axis of the stator. The ends of the wires exit the stator through a wire exit slot and terminate at an input a-c power source that can be comprised of a singe-phase power source, a two-phase power source or a three-phase power source. The frequency of the input power is proportionally synchronized with the rotational speed of the rotor which is controlled by an electronic control unit.

The circular rotor, which is dimensioned to rotate around the outer surface of the stator, includes an inner surface, an outer surface, a right edge and a left edge. To the inner surface is longitudinally attached a multiplicity of permanent magnets that are equally spaced with alternating north (N) and south (S) poles. To the rotor's right edge is attached a right circular plate and to the rotor's left edge is a left circular plate having a perimeter edge that is spaced from the inner surface of the cylindrical cylinder. The left circular plate also has a centered bore that is dimensioned to be attached over the central protrusion located on the stator.

To further enhance the utility of the BACM the central protrusion further includes a terminus from where extends a rod support cavity that terminates within the confines of the circular stator. Into the cavity is inserted a rigidly attached motor support rod that provides structural integrity and stability to the BACM.

The bearing has a perimeter edge that interfaces with the inner surface of the rotor. The bearing is designed to support the rotor without the need for a motor shaft and to add structural integrity to the BACM which significantly reduces motor vibrations.

The circular belt has a first end that is located around the outer surface of the circular rotor, and a second end that is located around a rotating work piece. Since the belt is located around the rotor, a motor shaft is not required.

In view of the above disclosure, the primary object of the invention is to produce a BACM that utilizes a plastic stator that eliminates the cogging and eddy currents that are prevalent in prior art motors. Additionally, the design of the BACM results in smooth rotation, produces less heat and provides higher torque and speed than similarly sized prior art motors.

In addition to the primary object of the invention it is also an object of the invention to produce a BACM that:
- can be produced in various sizes, horsepower and torque,
- has a back electro-magnetic force (EMF) that is higher than motors using conventional stator windings. The back EMF can also be used to provide and control the speed of the rotor and in particular a low motor speed,
- can be utilized as a generator by driving the rotor and producing a three-phase voltage source on the stator wiring, and
- can be electronically operated to control the speed of the motor.

These and other objects and advantages of the present invention will become apparent from the subsequent detailed description of the preferred embodiment and the appended claims taken in conjunction with the accompanying drawings.

DETAILED DESCRIPTION OF THE INVENTION

Figure 1:
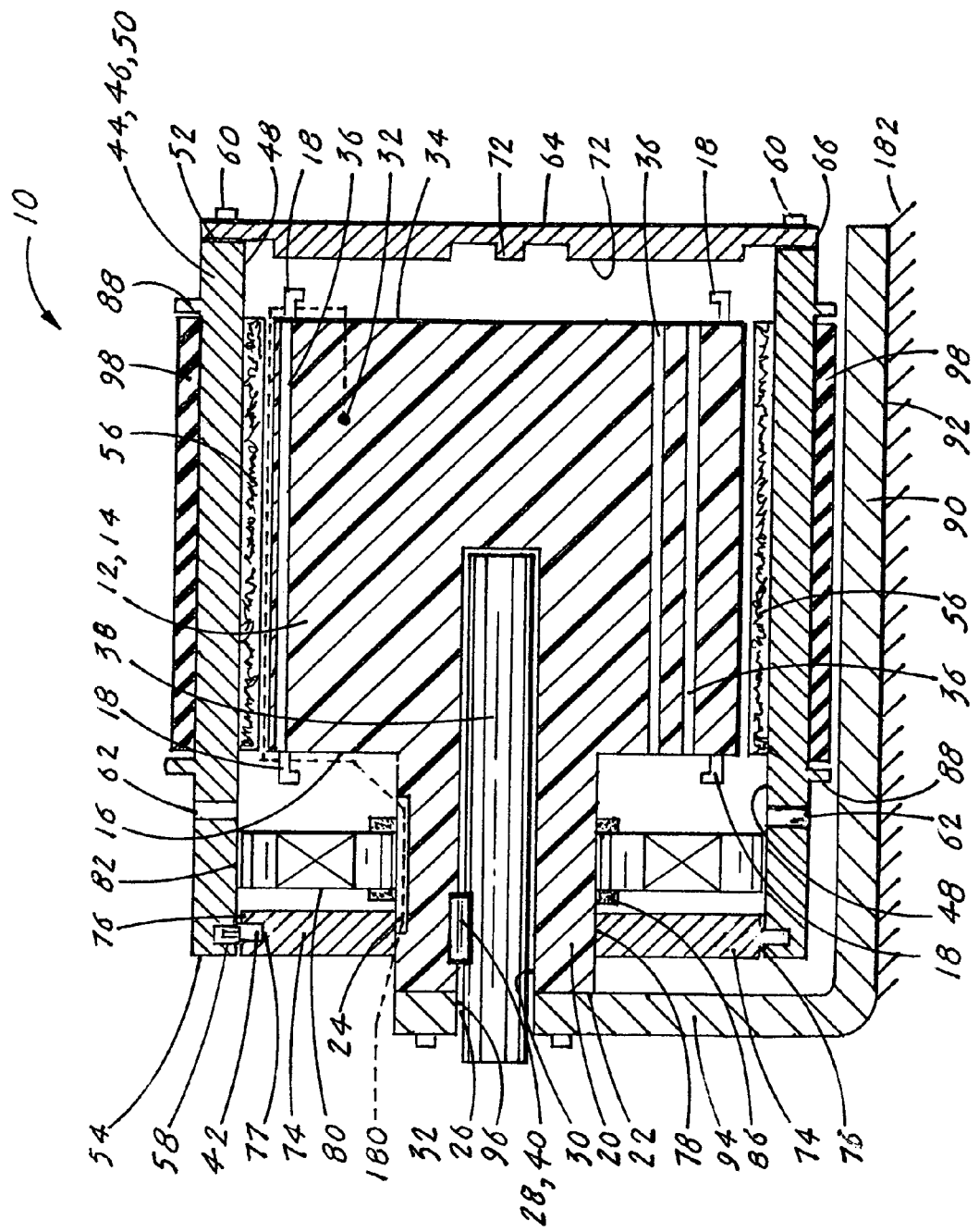
FIG. 1 is a side elevational-sectional view of a brushless a-c motor that operates with a stator made of plastic and having insulated wires that are wound parallel to the longitudinal axis of the stator.

The best mode for carrying out the brushless a-c motor 10 (hereinafter "BACM 10") is presented in terms of a preferred embodiment and a second embodiment. The preferred embodiment of the BACM 10, as shown in FIGS. 1-6, is designed to operate as a general-purpose a-c motor. The second embodiment, as shown in FIG. 7, is designed and adapted to allow the BACM 10 to power at least one of the wheels of a vehicle. In either design, the BACM 10 can be designed to be powered by either a single-phase, a two-phase or a three phase a-c power source that is proportionally synchronized with the rotational speed of the rotor 44. For the sake of brevity, the invention disclosure will be limited to a three-phase a-c power source 180, as shown in the FIG. 3 illustration.

The preferred embodiment of the BACM 10 is comprised of eight major elements: a stator 12, a motor support rod 38, a rotor 44, a multiplicity of permanent magnets 56, a right circular cooling plate 64, a left circular plate 74, a bearing 80 and a motor support stand 90.

Figure 2:
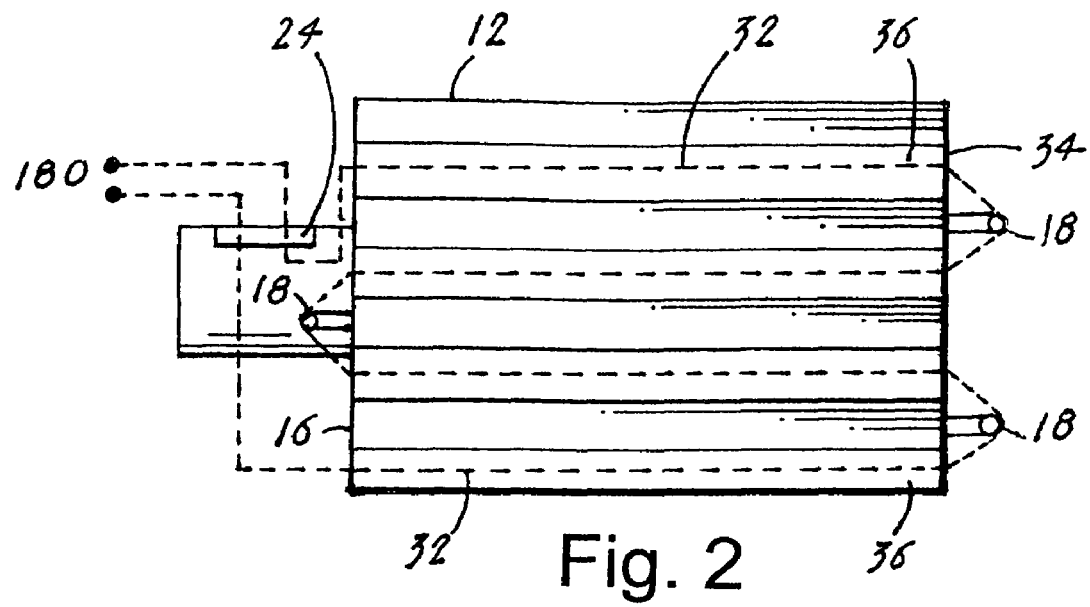
FIG. 2 is a side elevational view of the stator showing a multiplicity of wire attachment structures and wiring notches that are used to wind and retain the insulated wires referenced in FIG. 1.
Figure 3:
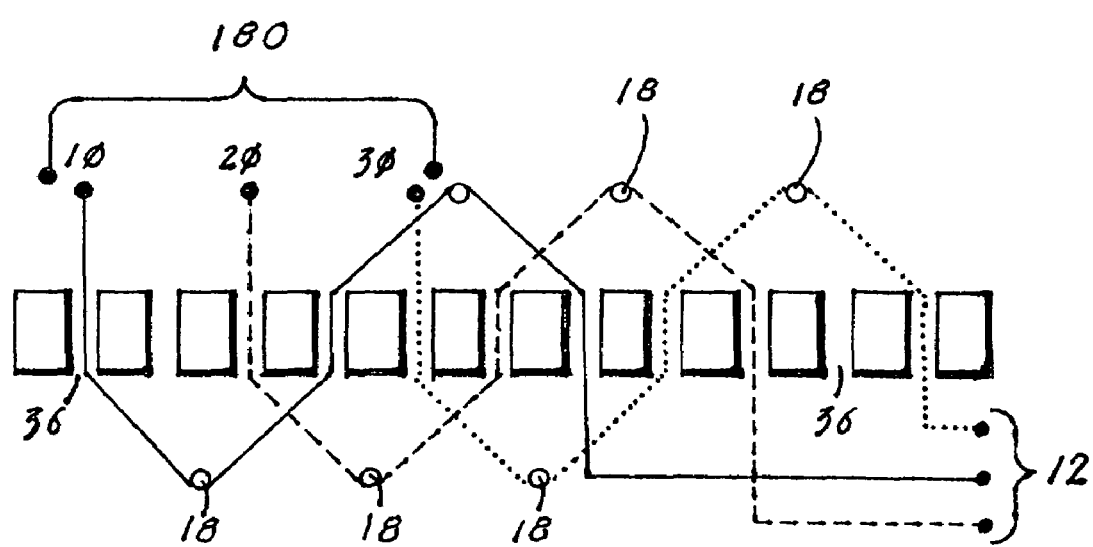
FIG. 3 is an illustration showing the wiring sequence for an a-c power source consisting of a three-phase a-c power.
Figure 4:
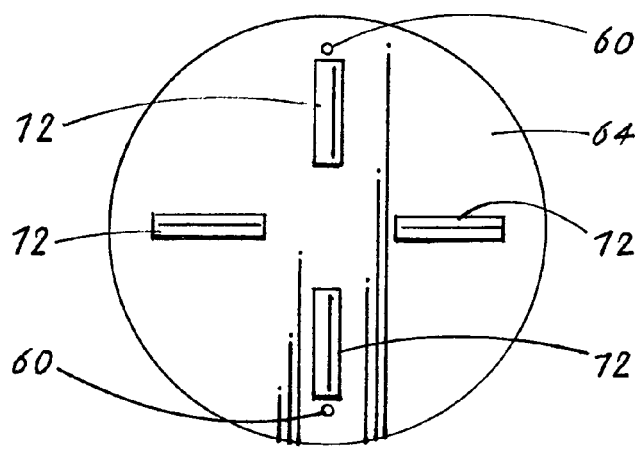
FIG. 4 is an elevational end view of the rotor's right circular plate showing the arrangement of a set of cooling fins that provide cooling air when the rotor is rotating.

The circular stator 12, as shown assembled in FIG. 1 and removed from the assembly in FIG. 2, is constructed of a non-conductive material that can be selected from the group consisting of acrylic, polycarbonate, nylon phenolic, polyurethane and TEFLON®. By using a plastic stator 12, the eddy currents and cogging that are prevalent in prior art metal stators can be eliminated.

The stator 12 includes an outer surface 14, a left intermediate surface 16 from where extends integrally a central protrusion 20 having a terminus 22, and a right surface 34. The outer surface 14, as best shown in FIG. 2, includes a multiplicity of longitudinally extending wiring notches 36. For the three-phase power source thirty-six notches are required when twelve permanent magnets 56 are attached to the rotor 44. From the left intermediate surface 16 and from the right surface 34 extend a multiplicity of wire attachment structures 18. For a three-phase power source a total of eighteen wire attachment structures 18 are required on both the left intermediate surface 16 and on the right surface 34. For clarity, only two sets of the structures 18 are shown in FIG. 1. The wiring structures 18 can be selected from the group consisting of studs, hooks, open eyelets and a pair of compressed springs.

Around and between the attachment structures 18 and inserted into the longitudinal wiring notches 36 is a multiplicity of insulated wires 32 that are wound parallel to the longitudinal axis of the stator 12. The ends of the wires 32 are inserted through a wire exit slot 24 that is located on the surface of the central protrusion 20. From the wire exit slot 24, which is dimensioned to accommodate the wiring from the three-phase power source, the wiring extends outward and terminates at the a-c power source 180, as shown in FIG. 1.

The central protrusion 20 also includes a rod support cavity 26 that extends from the terminus 22 of the protrusion 20 and that terminates within the circular stator 12, and a keyed slot 28 that extends longitudinally along the surface 30 of the rod support cavity 26.

The motor support rod 38, as also shown in FIG. 1, is made of a metal such as stainless steel and its function is to provide structural integrity and stability to the BACM 10. The rod 38 is dimensioned to be inserted into the rod support cavity 26 that extends from the central protrusion 20 into the stator 12. Along the outer surface of the rod 38 is located a longitudinal keyed tab 40 that is dimensioned to interface with the keyed slot 28 that extends along the rod support cavity 26. The combination of the keyed slot 28 and the keyed tab 40 maintains the motor support rod 38 in a secured fixed position.

Figure 5:
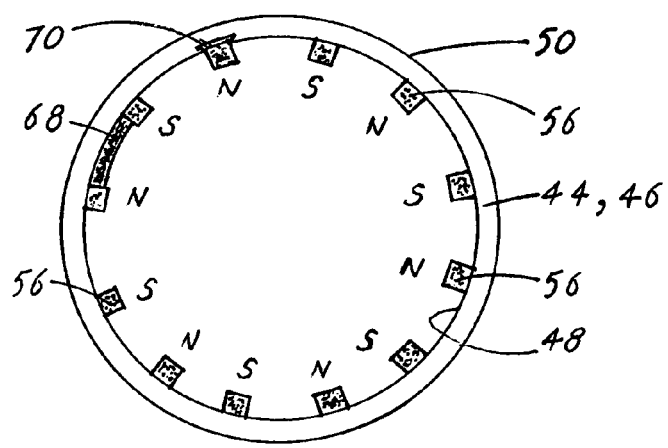
FIG. 5 is a sectional end view of the rotor showing the placement of twelve permanent magnets wherein the maximum number of magnets is dependent upon the space available on the rotor.
Figure 6:
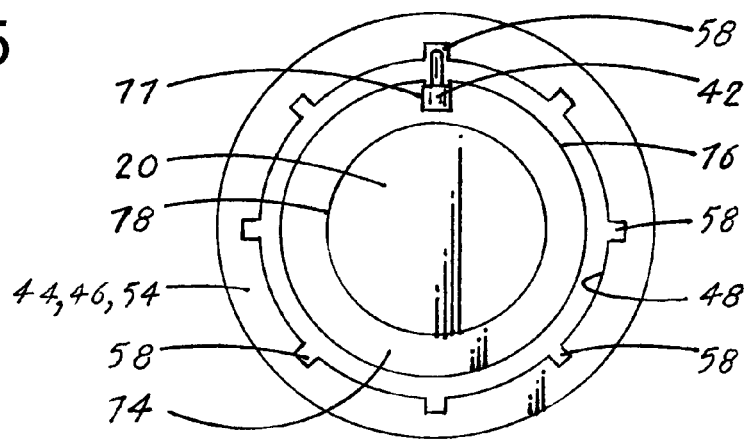
FIG. 6 is a sectional end view of a circular rotor and a left circular plate showing a rotor locking solenoid inserted into one of a plurality of locking cavities.
Figure 7:
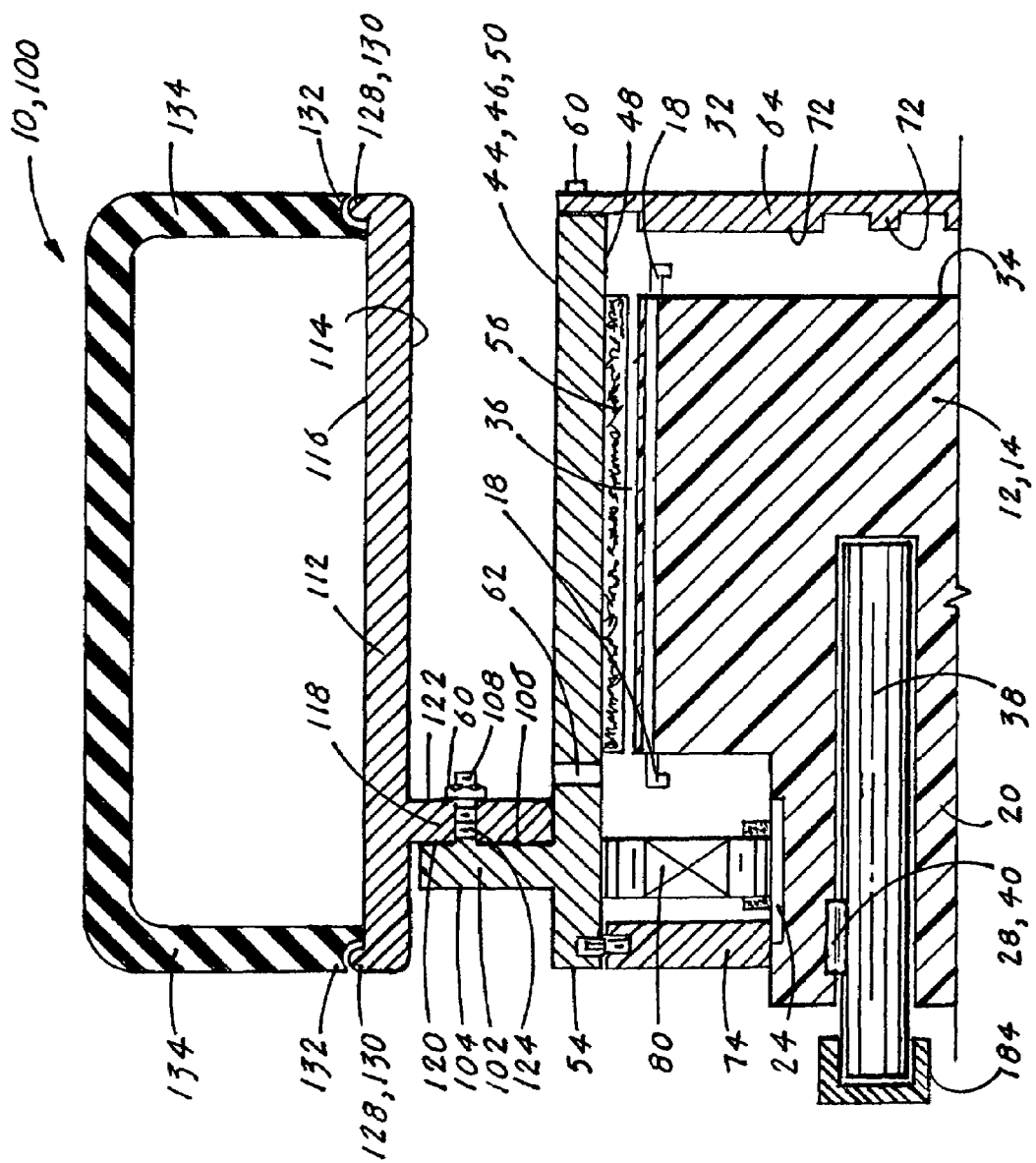
FIG. 7 is a side elevational-sectional view of a brushless a-c motor that is adapted for rotating a wheel of a vehicle.

The circular rotor 44, as shown in FIGS. 1, 5 and 6, is dimensioned to rotate around the outer surface 14 of the circular stator 12. The rotor 44, which is constructed of metal, is further comprised of a circular cylinder 46 having radially therethrough a plurality of cooling air outlets 62, a right circular cooling plate 64, a left, fixed locking plate 74 and a multiplicity of permanent magnets 56. As shown in FIG. 5, the inner surface 48 of the circular rotor 44 can include a magnet spacer 68 or a magnet groove 70 that further secure and maintain the magnets 56 in alignment. The plate 74, as shown in FIGS. 1 and 6, includes an electrically operated, rotor-locking solenoid 42 that can engage a plurality of locking cavities 58 that are located around the peripheral inner surface 48 of the circular cylinder 46, as shown best in FIG. 6.

The right circular cooling plate 64 has a diameter with a perimeter edge 66 that is attached flush with the right edge 52 of the cylinder 46 by an attachment means such as a bolt 60. The plate 64 further has a plurality of inward facing fins 72, as shown best in FIG. 4, that produce an in-flow of cooling air when the rotor 44 is rotating. The in-flow air is exhausted through the cooling air outlets 62, as shown in FIG. 1.

The left circular plate 74 has a diameter with a perimeter edge 76 that is spaced from the inner surface 48 and flush with the left edge 54 of the cylinder 46. The plate 74 further has a centered bore 78 that is dimensioned to fit over and be attached to the central protrusion 20 located on the stator 12. The perimeter edge 76 has a solenoid cavity 77 into which is inserted an electrically powered, spring-loaded solenoid 42. The solenoid is positioned to engage one of a plurality of locking cavities 58 that are located around the inner surface 48 of the circular cylinder 46, as shown in FIG. 6. When the solenoid 42 is powered, the solenoid 42 is placed in retracted position, allowing the rotor 44 to rotate. Conversely, when the solenoid 42 is not powered, the solenoid 42 is placed in an extended position that locks the rotor 44. The centerline of each locking cavity 58 is aligned with the centerline of a north (N) pole or a south (S) pole of a corresponding magnet 56 to establish a fixed relative position. This position further establishes a rotor starting point that is utilized by an electronics control unit (not shown) to determine if the rotor 44 is to rotate in either a clockwise or a counter-clockwise direction. Other methods of establishing a fixed relative position can also be utilized.

The rotor 44, the right circular plate 64, the left circular plate 74 and the motor support rod 38 can be made of a material that is selected from the group consisting of metal or plastic, wherein the plastic is further selected from the group consisting of polyphenylene, polyamide-imide and polyetherimide.

The multiplicity of permanent magnets 56, as shown in FIGS. 1 and 5, are longitudinally attached by an attachment means such as a heat-resistant adhesive, to the inner surface 48 of the circular cylinder 46. The magnets 56 are also equally spaced around the circumference of the circular cylinder 46, with alternating north (N) and south (S) poles, a total of twelve magnets are shown in FIG. 5. In general, the number of permanent magnets 56 can be any even number and depends upon the space that is available on the rotor 44. The permanent magnets 56 can be selected from the group consisting of Alnico, ceramic, samarium cobalt or Neodymium-iron-boron or the like.

The bearing 80, as shown in FIG. 1, has an outer diameter with a perimeter edge 82 that interfaces with the inner surface 48 of the circular cylinder 46. The bearing 80 is held laterally in place by a right retaining ring 84 and a left retaining ring 86, and directly and securely supports the rotor 44 without the need for a motor shaft. Thus eliminating or at least significantly reducing motor vibration. The hearing (80) can consist of a conventional roller bearing or a permanently lubed steel ball bearing.

The motor support stand 90 can be produced in several designs. An example of a typical stand 90, as shown in FIG. 1, includes a base 92 having means for being attached to a work surface 182, and an integral vertical section 94. The vertical section 94 has a bore 96 that fits over the central protrusion 20 located on the circular stator 12, and has means for being attached to the terminus 22 of the central protrusion 20. The means for attaching the right circular plate 64 and the vertical section 94 of the support stand 90 can be comprised of a threaded bolt 60.

The BACM 10 does not require an output shaft to transfer the electrical energy to a mechanical energy. Instead, a circular belt 98 can be utilized that has a first end that is wound around the outer surface 50 of the circular rotor 44 and a second end that is wound around a rotating work piece (not shown). To maintain the circular belt 98 in a lateral alignment, the outer surface 50 of the rotor 44 can include a pair of belt securement tabs 88, as shown in FIG. 1.

The second embodiment of the BACM 10, which is designed to power at least one wheel of a vehicle, is shown in FIG. 7. All the elements that comprise the second embodiment are similar to the embodiment with the exception of a modified circular cylinder 46 and the addition of a wheel attachment structure 100.

The wheel attachment structure 100, as shown in FIG. 7, is comprised of a cylindrical cylinder 46, a tire rim 112 and a tire 134.

The circular cylinder 46 has an inner surface 48 and an outer surface 50. From the outer surface 50 and adjacent the left edge 54 of the cylinder 46 extends outward an inner mounting tab 102. The tab 102 has an outer side 104 and an inner side 106, wherefrom the inner side 106 extends inward a threaded mounting stud 108.

The tire rim 112 has an inner surface 114 and an outer surface 116. From the inner side 114 extends downward an outer mounting tab 118 having an outer side 120 and an inner side 122. The inner side 106 of the inner mounting tab 102 interfaces with the outer side 120 of the outer mounting tab 118. The outer mounting tab 118 further has a bore 124 that is dimensioned to accept the threaded mounting stud 108 that secures both the tabs 102,118 when a nut 60 is tightened on the mounting stud 108. The tire rim 112 further has on each rim end 128 a tire mounting structure 130 that interfaces with a tire bead 132 of a tire 134.

While the invention has been described in detail and pictorially shown in the accompanying drawings it is not to be limited to such details, since many changes and modifications may be made to the invention without departing from the spirit and the scope thereof. For example, a motor shaft and gear assembly can easily be attached to the circular rotor 44 to transfer power. Also, the BACM 10 could be modified to function as a generator by driving the rotor 44 and producing a three-phase voltage from the stator 12. Additionally, the BACM 10 is primarily designed to function with a single non-conductive stator 12 and a single rotor 44 that utilizes a plurality of permanent magnets 56. A design having multiple stators 12 and rotors 44 that are concentrically aligned and located around a common single shaft can also be utilized. With this design, a maximum number of magnets 56 and wiring 32, as allowed by the space available, can be utilized to provide a high power output. Hence, this disclosure is described to cover any and all modifications and forms which may come within the language and scope of the claims.

BRUSHLESS A-C MOTOR
Element Designators
(For convenience of the Examiner, not part of the specification)

| | |
|---|---|
| 10 | Brushless A-C Motor (BACM) |
| 12 | Circular Stator |
| 14 | Outer Surface |
| 16 | Left Intermediate Surface |
| 18 | Wire Attachment Structure |
| 20 | Central Protrusion |
| 22 | Terminus |
| 24 | Wire Exit Slot |
| 26 | Rod Support Cavity |
| 28 | Keyed Slot |
| 30 | Surface |
| 32 | Wires |
| 34 | Right Surface |
| 36 | Wiring Notch |
| 38 | Motor Support Rod |
| 40 | Longitudinal Keyed Tab |
| 42 | Rotor Locking Solenoid |
| 44 | Circular Rotor |
| 46 | Circular Cylinder |
| 48 | Inner Surface |
| 50 | Outer Surface |
| 52 | Right Edge |
| 54 | Left Edge |
| 56 | Permanent Magnet |
| 58 | Locking Cavities |
| 60 | Bolt or Nut |
| 62 | Cooling Air Outlet |
| 64 | Right Circular Cooling Plate |
| 66 | Perimeter Edge |
| 68 | Magnet Spacer |
| 70 | Magnet Groove |
| 72 | Inward Fin |
| 74 | Left Circular Plate |
| 76 | Perimeter Edge |
| 77 | Solenoid Cavity |
| 78 | Centered Bore |
| 80 | Bearing |
| 82 | Perimeter Edge |
| 84 | Right Retaining Ring |
| 86 | Left Retaining Ring |
| 88 | Belt Securement Tab |
| 90 | Support Stand |
| 92 | Base |
| 94 | Integral Vertical Section |
| 96 | Bore |
| 98 | Belt |
| 100 | Wheel Attachment Structure |
| 102 | Inner Mounting Tab |
| 104 | Outer Side |
| 106 | Inner Side |
| 108 | Threaded Mounting Stud |
| 110 | |
| 112 | Tire Rim |
| 114 | Inner Surface |
| 116 | Outer Surface |
| 118 | Outer Mounting Tab |
| 120 | Outer Side |
| 122 | Inner Side |
| 124 | Bore |
| 126 | |
| 128 | Rim End |
| 130 | Tire Mounting Structure |
| 132 | Tire Bead |
| 134 | Tire |
| 136 | |

-continued

BRUSHLESS A-C MOTOR
Element Designators
(For convenience of the Examiner, not part of the specification)

| | |
|---|---|
| 138 | |
| 140 | |
| 180 | A-C Power Source |
| 182 | Work Surface |
| 184 | Vehicle Structure |

The invention claimed is:

1. A brushless a-c motor (10) comprising:
 a) a circular stator (12) made of plastic and having:
  (1) an outer surface (14) having a multiplicity of longitudinally extending wiring notches (36),
  (2) a left intermediate surface (16) from where extends a multiplicity 10 of wire attachment structures (18) and an integral central protrusion (20) and
  (3) a right surface (34) from where extends a multiplicity of wire attachment structures (18), wherein around and between the attachment structures (18) and inserted into the longitudinal wiring notches (36) is a multiplicity of insulated wires (32) that are wound parallel to the longitudinal axis of said stator (12), wherein the ends of the wires (32) exit the motor (10) and terminate at an a-c power source (180),
 b) a circular rotor (44) that is dimensioned to rotate around the outer surface (14) of said circular stator (12), said rotor (44) having:
  (1) an inner surface (48) having longitudinally attached thereto a multiplicity of permanent magnets that are equally spaced with alternating north (N) and south (S) poles,
  (2) an outer surface (50),
  (3) a right edge (52),
  (4) a left edge (54),
  (5) a right circular cooling plate (64) that is attached to the right edge (52) of said circular rotor (44), and
  (6) a left circular plate (74) having a perimeter edge (76) that is spaced from the inner surface (48) of the cylindrical cylinder (46) and having a centered bore (78) that is dimensioned to be attached over the central protrusion (20) located on said stator,
 c) a bearing (80) having a perimeter edge (82) that interfaces faith the inner surface (48) of said rotor (44), and
 d) a circular belt (98) having a first end that is wound around the outer surface (50) of said circular rotor (44), and a second end that is wound around a rotating work piece.

2. The brushless a-c motor as specified in claim 1 wherein the perimeter edge of the left circular plate further having a solenoid cavity into which is inserted and attached an electrically powered, spring-loaded solenoid that is dimensioned to engage one of a plurality of locking cavities that are located around the inner surface of said circular cylinder, wherein when power is applied to the solenoid, the solenoid retracts allowing said rotor to rotate conversely, when power is not applied the solenoid is placed in its extended position locking said rotor.

3. The brushless a-c motor as specified in claim 1 wherein said rotor, right circular cooling plate, left circular plate and said motor support rod are made of a material selected from the group consisting of metal or plastic, wherein the plastic is further selected from the group consisting of polyphenylene, polyamide-imide and polyetherimide.

4. The brushless a-c motor as specified in claim 1 wherein said bearing is comprised of a permanently-lubed steel ball bearing.

5. The brushless a-c motor as specified in claim 1 wherein said motor operates with an input comprising of either a single-phase power source, a two-phase power source or a three-phase power source wherein the frequency of the input power source is proportionally synchronized with the rotational speed of said rotor.

6. The brushless a-c motor as specified in claim 1 wherein the central protrusion further having a terminus from where extends a rod support cavity that terminates within the confines of said circular stator, wherein into the cavity is inserted a rigidly attached motor support rod that provides structural integrity and stability to said brushless a-c motor.

7. A brushless a-c motor (10) comprising:
  a) a circular stator (12) having:
    (1) an outer surface (14) having a multiplicity of longitudinally extending wiring notches (36),
    (2) a left intermediate surface (16) from where extends a multiplicity of wire attachment structures (18) and an integral central protrusion (20) having:
      (a) a terminus (22),
      (b) a wire exit slot (24), and
      (c) a rod support cavity (26) that extends from the terminus (22) and terminates within said stator (12), and having a keyed slot (28) that extends longitudinally along the surface (30) of the rod support cavity (26),
    (3) a right surface (34) from where extends a multiplicity of wire attachment structures (18), wherein around and between the attachment structures (18) and inserted into the longitudinal wiring notches (36) is a multiplicity of insulated wires (32) that are wound parallel to the longitudinal axis of said stator (12), wherein the ends of the wires (32) are inserted through the wire exit slot (24) and terminate at an a-c power source (180),
  b) a motor support rod (38) that is dimensioned to be inserted into the rod support cavity (26), said rod (38) having along its outer surface a longitudinal keyed tab (40) that is dimensioned to interface with the keyed slot (28) located on the rod support cavity (26), wherein the combination of the keyed slot (28) and the keyed tab (40) maintains said motor support rod (38) and said stator (12) in a fixed position,
  c) a circular rotor (44) that is dimensioned to rotate around the outer surface (14) of said circular stator (12), said rotor (44) comprising a circular cylinder (46) leaving:
    (1) an inner surface (48),
    (2) an outer surface (50),
    (3) a right edge (52),
    (4) a left edge (54),
    (5) a multiplicity of permanent magnets (56) that are longitudinally attached by an attachment means to the inner surface (48) of the circular cylinder (46), wherein said magnets (56) are also equally spaced around said circular cylinder (46) with alternating north (N) and south (S) poles,
    (6) a plurality of cooling air outlets (62) that are spaced around said circular cylinder,
    (7) a right circular cooling plate (64) having a diameter with a perimeter edge (66) that is attached to the edge (52) of said cylinder (46) by an attachment means, said cooling plate (64) further having a plurality of inward fins (72) that produce an in-flow of cooling air when said motor (10) is operating,
    (8) a left circular plate (74) having a diameter with a perimeter edge (76) that is spaced from the inner surface (48) of the said cylindrical cylinder (46) and having a solenoid cavity (77) and a centered bore (78) that is dimensioned to fit over and be attached to the central protrusion (20) located on said stator (12),
    (9) a plurality of locking cavities (58) that are equally spaced around the inner surface (48) of said circular cylinder (46), wherein the centerline of each cavity (58) is aligned with the centerline of a N pole or S pole of a corresponding said magnet (56), wherein the alignment establishes a rotor starting point that is utilized by an electronic control unit to determine if said rotor (44) is to rotate in either a clockwise or a counter-clockwise direction,
    (10) an electrically powered, spring-loaded solenoid (42) that is inserted into the solenoid cavity (77) on the perimeter edge (76) of the left circular plate (74), wherein the solenoid (42) is positioned, to engage one of a plurality of locking cavities (58) that are located around the inner surface (48) of said circular cylinder (46), wherein when the solenoid (42) is powered, the solenoid (42) is placed in a retracted position, allowing said rotor (44) to rotate, conversely when said solenoid (42) is not powered, the solenoid (42) is placed in an extended position locking said rotor (44),
  d) a bearing (80) having a diameter with a perimeter edge (82) that interfaces with the inner surface (48) of said circular cylinder (46), wherein said bearing (80) is held laterally in place by a right retaining ring (84) and a left retaining ring (86),
  e) a motor support stand (90) comprising:
    (1) a base (92) having means for being attached to a work surface, and
    (2) an integral vertical section (94) having a bore (96) that fits over the central protrusion (20) located on said circular stator (12), said vertical section (94) having means for being attached to the terminus (22) of the central protrusion (20), and
  f) a circular belt (98) having a first end that is wound around the outer 10 surface (50) of said circular rotor (44), and a second end that is wound around a rotating work piece.

8. The brushless a-c motor as specified in claim 7 wherein said stator is constructed of a non-conductive material that is selected from the group consisting of acrylic, polycarbonate, nylon, phenolic, polyurethane.

9. The brushless a-c motor as specified in claim 7 wherein said wire attachment structure is selected from the group consisting of studs, hooks, open eyelets and a pair of compressed springs.

10. The brushless a-c motor as specified in claim 7 wherein said wire exit slot is dimensioned to accommodate three-phase wiring.

11. The brushless a-c motor as specified in claim 7 wherein a fixed relative position is established from the centerline of the locking cavities and the centerline of a N or S pole of a corresponding said magnet, wherein the fixed relative position establishes a rotor starting point from where the initial current can be determined that establishes said rotor's direction of rotation.

12. The brushless a-c motor as specified in claim 7 wherein said permanent magnets are selected from the group consisting of Alnico, ceramic, samarium cobalt and Neodymium-iron-boron.

13. The brushless a-c motor as specified in claim 12 wherein said means for attaching said magnets to the inner surface of said circular rotor comprises a heat-resistant adhesive.

14. The brushless a-c motor as specified in claim 13 further comprising on the inner surface of said circular rotor a magnet spacer or a magnet groove that secures and maintains said magnets in alignment.

15. The brushless a-c motor as specified in claim 7 wherein said means for attaching the right circular cooling plate and the vertical section of said support stand comprises a threaded bolt.

16. The brushless a-c motor as specified in claim 7 wherein on the outer surface of said rotor is located a pair of belt securement tabs that maintain said circular belt in lateral alignment.

17. The brushless a-c motor as specified in claim 7 wherein said a-c power source is selected from the group consisting of single-phase power, two-phase power and three-phase power, wherein the frequency of the a-c power source is proportionally synchronized with the rotational speed of said rotor.

18. A brushless a-c motor (10) comprising:
   a) a circular stator (12) having:
      (1) an outer surface (14) having a multiplicity of longitudinally extending wiring notches (36),
      (2) a left intermediate surface (16) from where extends a multiplicity of wire attachment structures (18) and an integral central protrusion (20) having:
         (a) a terminus (22),
         (b) a wire exit slot (24),
         (c) a rod support cavity (26) that extends from the terminus (22) and terminates within said circular stator (12), and having a keyed slot (28) that extends longitudinally along the surface (30) of the rod support cavity (26),
      (3) a right surface (34) from where extends a multiplicity of wire attachment structures (18), wherein around and between the attachment structures (18) and inserted into the longitudinal wiring notches (36) is a multiplicity of insulated wires (32) that are wound parallel to the longitudinal axis of said stator (12), wherein the ends of the wires (32) are inserted through the wire exit slot (24) and terminate at an a-c power source (180),
   b) a motor support rod (38) that is dimensioned to be inserted into the rod support cavity (26), said rod (38) having an outer end that is inserted into a vehicle structure (184) and having along its outer surface a longitudinal keyed tab (40) that is dimensioned to interface with the keyed slot (28) located on the rod support cavity (26), wherein the combination of the keyed slot (28) and the keyed tab (40) maintains said motor support rod (38) in a fixed position,
   c) a circular rotor (44) that is dimensioned to rotate around the outer surface (14) of said circular stator (12), said rotor (44) comprising a circular cylinder (46) having:
      (1) an inner surface (48),
      (2) an outer surface (50),
      (3) a right edge (52),
      (4) a left edge (54),
      (5) a multiplicity of permanent magnets (56) that are longitudinally attached by an attachment means to the inner surface (48) of the circular cylinder (46), wherein said magnets (56) are also equally spaced around said circular cylinder (46) with alternating north (N) and south (S) poles,
      (6) a plurality of cooling air outlets (62) that are spaced around said circular cylinders,
      (7) a right circular cooling plate (64) having a diameter with a perimeter edge (66) that is attached to the right edge (52) of said cylinder (46) by an attachment means, said cooling plate (64) further having a plurality of inward fins (72) that produce an in-flow of cooling air when said motor (10) is operating,
      (8) a left circular plate (74) having a diameter with a perimeter edge (76) that is spaced from the inner surface (48) of said cylinder (46), said plate (74) having a solenoid cavity (77) and a centered bore (78) that is dimensioned to fit over and be attached to the central protrusion (20) located on said stator (12),
      (9) a plurality of locking cavities (58) that are equally spaced around the inner surface (48) of said circular cylinder (46), wherein the centerline of each cavity (58) is aligned with the centerline of a N or S pole of a corresponding said magnet (56), wherein the alignment establishes a rotor starting point that is utilized by an electronic control unit to determine if said rotor (44) is to rotate in either a clockwise or a counter-clockwise direction,
      (10) an electrically powered, spring-loaded solenoid (42) that is inserted into the solenoid cavity (77) on the perimeter edge (76) of the left circular plate (74), wherein the solenoid (42) is positioned, to engage one of a plurality of locking cavities (58) that are located around the inner surface (48) of said circular cylinder (46), wherein when the solenoid (42) is powered, the solenoid (42) is placed in a retracted position, allowing said rotor (44) to rotate, conversely when said solenoid (42) is not powered, the solenoid (42) is placed in an extended position locking said rotor (44),
   d) a bearing (80) having an outer diameter with a perimeter edge (82) that interfaces with the inner surface (48) of the said circular cylinder (46), wherein said bearing (80) is held laterally in place by a right retaining ring (84) and a left retaining ring (86),
   e) a wheel attachment structure (100) comprising:
      (1) a circular cylinder (46) having an inner surface (48) and an outer surface (50) wherefrom the outer surface (50) and adjacent the left edge (54) extends outward an inner mounting tab (102) having an outer side (104) and an inner side (106), wherefrom the inner side (106) extends inward a threaded mounting stud (108), and
      (2) a tire rim (112) having an inner surface (114) and an outer surface (116), wherefrom the inner side (114) extends downward an outer mounting tab (118) having an outer side (120) and an inner side (122), wherein the inner side (106) of the inner mounting tab (102) interfaces with the outer side (120) of the outer mounting tab (118), wherein the outer mounting tab (118) further having a bore (124) that is dimensioned to accept the threaded mounting stud (108) that secures both the tabs (102,118) when a nut (60) is tightened on the mounting stud (108), wherein the tire rim (112) further has on each rim end (128) a tire mounting structure (130) that interfaces with a tire bead (132) of a tire (134).

* * * * *